July 21, 1936.  G. C. COIL  2,048,106
FULL STROKE MECHANISM
Original Filed April 12, 1933
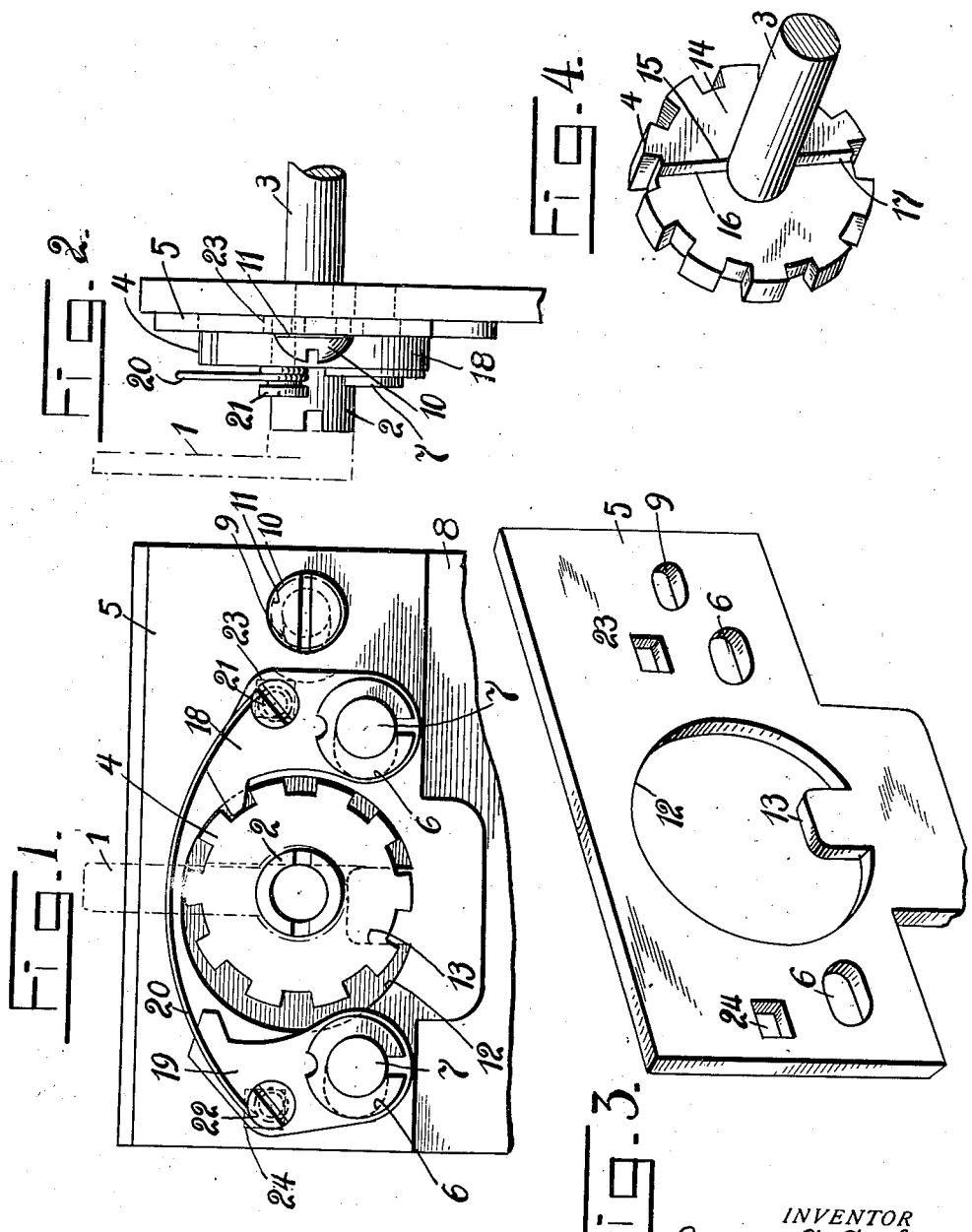
INVENTOR
Grover C. Coil
Hastings W. Baker
ATTORNEY Patented July 21, 1936

2,048,106

UNITED STATES PATENT OFFICE 2,048,106

FULL STROKE MECHANISM

Grover C. Coil, Dayton, Ohio, assignor, by mesne assignments, to Central United National Bank, Cleveland, Ohio, as trustee Original application April 12, 1933, Serial No. 665,668. Divided and this application April 12, 1933, Serial No. 665,667

2 Claims. (Cl. 235—129)

The object of this invention is to provide a full stroke mechanism which is accurate and positive in operation and is designed to be made of parts which may be manufactured with a minimum of expense. This application is a division of my co-pending application for Printing odometer, Serial No. 665,668, filed April 12, 1933, now Patent Number 1,986,185.

Referring to the drawing:

Fig. 1 is an elevational view;

Fig. 2 is a view taken at right angles to that shown in Fig. 1;

Fig. 3 is a perspective view of the shifting plate; and

Fig. 4 is a perspective view partly in cross section of the full stroke ratchet and parts secured thereto.

I have provided an operating handle 1 operatively connected to a sleeve 2 secured to a shaft 3. Secured to this shaft is a full stroke ratchet 4. The shifting plate 5 is provided with slots 6 which receive guide bolts 7, which bolts are secured to a fixed plate 8. The shifting plate 5 is also provided with a slot 9 through which passes a bolt 10 secured to the plate 8. Interposed between the head of the bolt 10 and the plate 5 is a friction cup washer 11, the object of which is to hold the shifting plate in the position into which it is shifted. The plate 5 is also provided with a circular opening 12 adapted to receive the full stroke ratchet 4. It is also provided with an upstanding tongue 13 projecting into the opening 12. The full stroke ratchet 4 is provided with an offset 14 ending in an abrupt wall 15 having an upper end 16 and a lower end 17. When the handle 1 is in its upright position the lower end 17 of the wall 15 engages the right-hand end of the tongue 13 but as the handle is rotated in an anti-clockwise direction as viewed in Fig. 1 for 180 degrees the end 16 of the wall 15 will engage the left-hand end of the tongue 13 and shift the plate 5 to the right.

Mounted on the bolts 7 are two full stroke pawls 18 and 19, which pawls are normally urged towards each other and towards the full stroke ratchet by means of a spring 20 which is anchored on studs 21 and 22 respectively, which studs pass through slots 23 and 24 respectively in the shifting plate 5. The length of these slots 23 and 24 is slightly greater than the diameter of the studs 21 and 22 and is less than the distance that the shifting plate would be moved by the wall 15, the arrangement being such that when the shifting plate is shifted the pawl which has been in engagement with the full stroke ratchet will be disengaged therefrom and the other pawl engaged therewith. The slots 23 and 24 permit the pawls 18 and 19 to ride over the teeth of the ratchet when the ratchet is being rotated, that is, the pawl 18 rides over the teeth of the ratchet when the handle is being rotated in an anti-clockwise direction but lock it against rotation if an attempt should be made to rotate it in a clockwise direction, whereas the action of the pawl 19 when it engages the full stroke ratchet is just the reverse. By this arrangement the handle 1 must be rotated a full 180 degrees before it can be moved in the opposite direction for an appreciable amount.

I realize that many changes may be made in the specific form of this invention shown and described by way of illustration in this application and I, therefore, reserve the right to make such changes in the specific form of the invention as shown herein as I may find to be desirable. I, therefore, claim the invention broadly except as I may limit myself by the appended claims.

Having now described my invention, I claim:

1. In a full stroke mechanism, a full stroke ratchet, a shifting plate provided with slots, pawls mounted on opposite sides of said full stroke ratchet, a pin carried by each of said pawls and projecting into a related one of said slots, a spring inter-connecting the pawls and urging said pawls towards said ratchet, means whereby said plate is shifted and means operable when the plate is being shifted to disengage the pawl which is in engagement with the ratchet, said spring serving as a means to engage the other pawl with the ratchet when the plate is shifted.

2. In a full stroke mechanism, a full stroke ratchet, a shifting plate provided with slots, pawls mounted on opposite sides of said full stroke ratchet, a pin carried by each of said pawls and projecting into a related one of said slots, spring means to urge said pawls towards said ratchet and means whereby said plate is shifted, the pin of the pawl in engagement with the ratchet being engaged by the end of the slot nearest the ratchet so as to disengage its pawl from the ratchet when the plate is shifted, said spring means thereupon serving as a means to engage the other pawl with the ratchet.

GROVER C. COIL.